(12) United States Patent
Wang

(10) Patent No.: US 7,204,789 B1
(45) Date of Patent: Apr. 17, 2007

(54) PEDAL DEVICE FOR CYCLING APPARATUS

(76) Inventor: Lo Pin Wang, 16F-2, No. 62, Sec. 2, Chongder 2nd Road, Beitun Chu, Taichung 40652 (TW)

( * ) Notice: Subject to any disclaimer, the term of this patent is extended or adjusted under 35 U.S.C. 154(b) by 22 days.

(21) Appl. No.: 11/253,947

(22) Filed: Oct. 18, 2005

(51) Int. Cl.
*A63B 69/16* (2006.01)
*G05G 1/14* (2006.01)

(52) U.S. Cl. .................................. 482/57; 74/594.6

(58) Field of Classification Search .... 74/594.1–594.6; 482/51, 57; 36/62, 131, 132; 280/11.3, 280/11.31, 11.33
See application file for complete search history.

(56) References Cited

U.S. PATENT DOCUMENTS

| | | | |
|---|---|---|---|
| 550,409 A | 11/1895 | Hanson | |
| 4,932,287 A * | 6/1990 | Ramos | 74/594.6 |
| 5,423,233 A * | 6/1995 | Peyre et al. | 74/594.6 |
| 5,778,739 A * | 7/1998 | Takahama | 74/594.6 |
| 5,855,147 A * | 1/1999 | Nagano | 74/594.6 |
| 6,324,941 B1 * | 12/2001 | Ho | 74/594.6 |
| 6,722,229 B2 * | 4/2004 | Muraoka | 74/594.6 |
| 6,729,204 B1 * | 5/2004 | Chen | 74/594.6 |
| 2005/0011305 A1 * | 1/2005 | Menayan | 74/594.6 |

* cited by examiner

*Primary Examiner*—Jerome Donnelly
*Assistant Examiner*—Tam Nguyen
(74) *Attorney, Agent, or Firm*—Charles E. Baxley

(57) ABSTRACT

A pedal device includes a barrel for attaching to a cycling apparatus and having a fixed seat, a movable seat slidably attached onto the barrel and having a number of recesses facing toward corresponding recesses of the fixed seat, a spring biasing device for biasing the movable seat to move toward the fixed seat of the barrel, and an attachment for attaching to a bicycle shoe and having two end catches for selectively engaging with the recesses of the fixed seat and the movable seat, and for selectively anchoring the bicycle shoe to the seats of the pedal device. The movable seat is movable away from the fixed seat against the biasing device by the attachment.

6 Claims, 7 Drawing Sheets

PEDAL DEVICE FOR CYCLING APPARATUS

BACKGROUND OF THE INVENTION

1. Field of the Invention

The present invention relates to a pedal device, and more particularly to a pedal device for attaching to various cycling apparatuses, such as bicycles, unicycles, tricycles, cycling exercisers, etc., and for allowing bicycle shoes to be quickly attached or anchored to the pedal device, and also to be quickly and selectively detached or disengaged from the pedal device.

2. Description of the Prior Art

Typical cycling apparatuses, such as bicycles, unicycles, tricycles, cycling exercisers, etc., comprise a pair of foot pedals attached thereto, for being stepped or ridden or operated by the users. However, while riding or operating the cycling apparatuses, the bicycle shoes of the riders may easily slip relative to the foot pedals.

For preventing the bicycle shoes from slipping relative to the foot pedals, some of the bicycle shoes include one or more cleats or attachments attached to the bottom portion thereof, for engaging with or for anchoring to the pedal devices, and thus for preventing the bicycle shoes from slipping relative to the foot pedals.

For example, U.S. Pat. No. 550,409 to Hanson discloses one of the typical attachments for bicycle pedals also comprising one or more cleats or attachments attached to the bottom portion of the bicycle shoes, for engaging with or for anchoring to the pedal devices of typical cycling apparatuses, by rotating the cleats or attachments of the bicycle shoes relative to the pedal devices for a predetermined angle.

However, the typical pedal devices comprise a predetermined or integral structure that the cleats or attachments of the bicycle shoes may not be easily engaged therewith. For example, when engaging the cleats or attachments of the bicycle shoes with the typical pedal devices, both of the feet of the user have to be precisely rotated relative to the pedal devices for the predetermined angle, to align the cleats or attachments with the pedal devices, and to allow the cleats or attachments to be engaged with the bicycle pedal devices.

The present invention has arisen to mitigate and/or obviate the afore-described disadvantages of the conventional pedal devices for cycling apparatuses.

SUMMARY OF THE INVENTION

The primary objective of the present invention is to provide a pedal device for attaching to various cycling apparatuses, and for allowing bicycle shoes to be quickly attached or anchored to the pedal device, and also to be quickly and selectively detached or disengaged from the pedal device.

In accordance with one aspect of the invention, there is provided a pedal device for attaching to a cycling apparatus, the pedal device comprising a barrel for attaching to the cycling apparatus, and including a fixed seat provided thereon and including a number of recesses formed therein, a movable seat slidably attached onto the barrel, and slidable relative to the fixed seat of the barrel, and including a number of recesses formed therein and facing toward the recesses of the fixed seat of the barrel, a spring biasing device for biasing the movable seat to move toward the fixed seat of the barrel, and an attachment for attaching to a bicycle shoe, and including two end catches for selectively engaging with the recesses of the fixed seat and the movable seat, and for selectively anchoring and positioning the bicycle shoe to the fixed and the movable seats of the pedal device, the movable seat being movable away from the fixed seat against the biasing device by the attachment before the end catches of the attachment are engaged with the recesses of the fixed and the movable seats.

The barrel includes a non-circular segment provided thereon, and the movable seat includes a non-circular opening formed therein for selectively engaging with the non-circular segment of the barrel, and for selectively anchoring the movable seat to the barrel.

The movable seat includes a projection extended therein, for selectively engaging with the segment of the barrel and for limiting the movable seat to move relative to the barrel and the fixed seat. The barrel includes a nut secured thereon, and the biasing device includes a the spring member engaged between the lock nut of the barrel and the projection of the movable seat, for biasing and forcing the movable seat to move toward the fixed seat of the barrel.

The movable seat includes an inclined surface formed therein and having the recesses thereof formed therein, for guiding the end catches of the attachment to engage with the recesses of the movable seat. The fixed seat may also include an inclined surface formed therein and having the recesses thereof formed therein, for guiding the end catches of the attachment to engage with the recesses of the fixed seat.

A shaft may further be provided and includes a first end for attaching to the cycling apparatus, and the barrel including a bore formed therein for receiving and engaging onto the shaft. The shaft includes a tapered segment provided thereon and located between two cylindrical segments, and two gaskets engaged onto the cylindrical segments of the shaft respectively, for supporting the barrel on the shaft.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
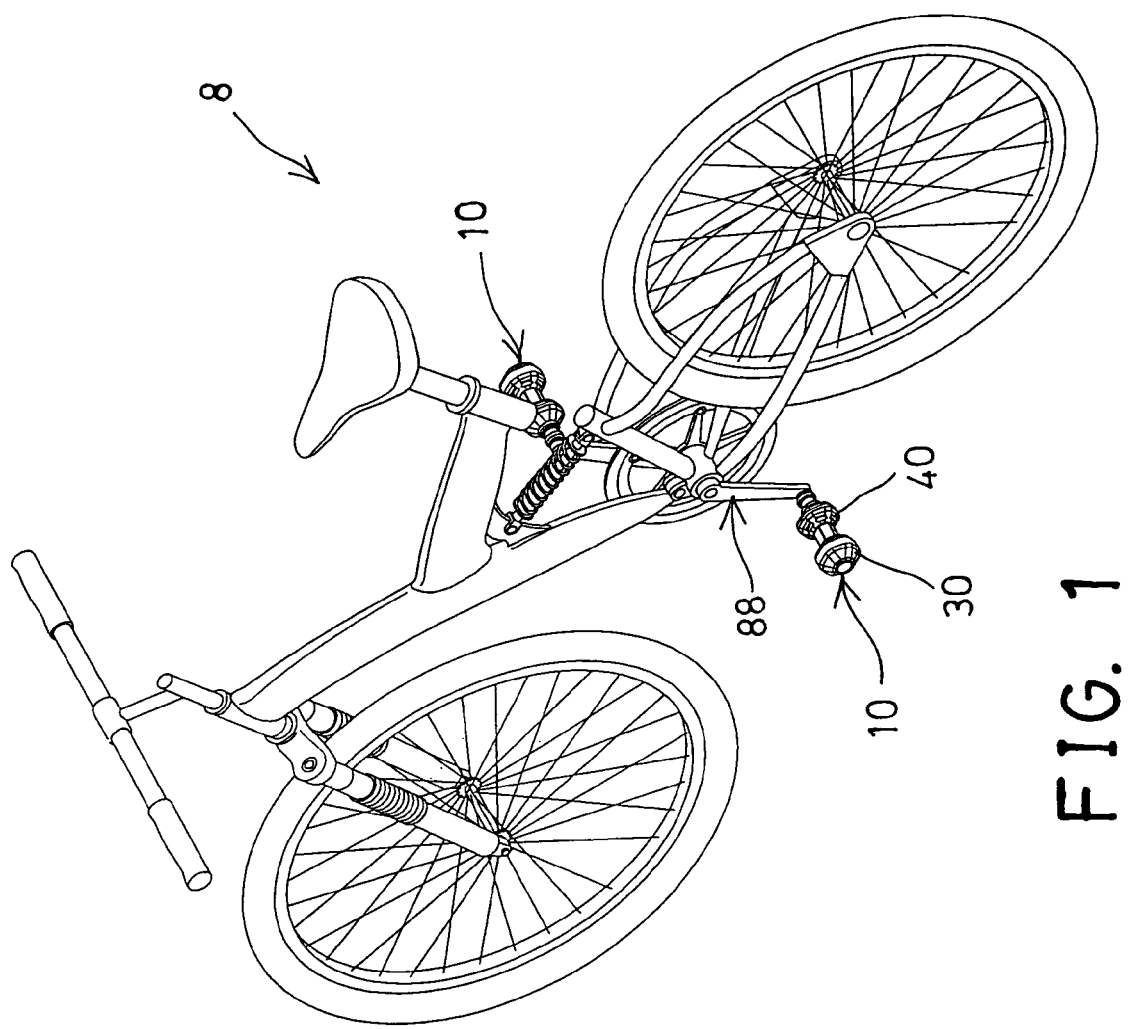
FIG. 1 is a perspective view of a bicycle having a pedal device in accordance with the present invention.
Figure 2:
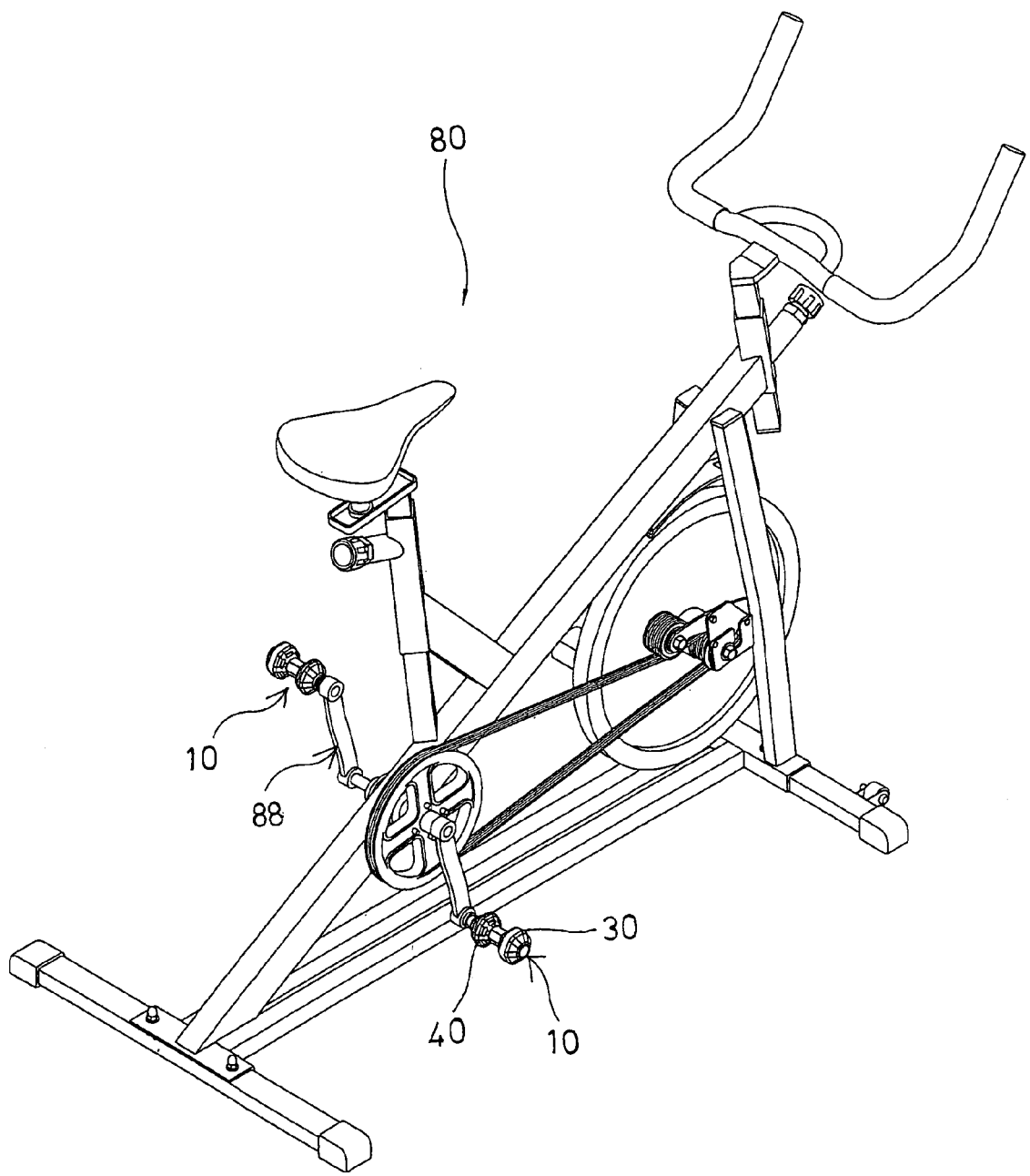
FIG. 2 is a perspective view similar to FIG. 1, illustrating a cycling exerciser having a pedal device in accordance with the present invention.

Referring to the drawings, and initially to FIGS. 1 and 2, a pedal device 10 in accordance with the present invention is provided or arranged for attaching to the crank device 88 of various cycling apparatuses 8, such as bicycles 8 (FIG. 1), unicycles or tricycles (not shown), cycling exercisers 80 (FIG. 2), etc., and for allowing a bicycle shoe 90 (FIG. 5) to be quickly attached or anchored to the pedal device 10, and also to be quickly and selectively detached or disengaged from the pedal device 10.

As shown in FIGS. 3–8, the pedal device 10 comprises a shaft 11 including one end 12, such as a threaded end or an inner end 12 for threading or attaching or securing to the crank device 88 of the cycling apparatus 8, and including an inclined or tapered or cone-shaped segment 13 formed or provided in the middle portion thereof, and preferably located between two cylindrical segments 14, 15, in which one of the cylindrical segments 14 is located close to the other or outer end 16 of the shaft 11, and the other cylindrical segment 15 is located closer to the inner end or the threaded end 12 of the shaft 11.

It is preferable that the cylindrical segment 15 includes an outer diameter slightly smaller than that of the inner or threaded end 12 of the shaft 11, to form or define a peripheral shoulder 17 therebetween, and the outer diameter of the cylindrical segment 15 is greater than that of the outer cylindrical segment 14. The shaft 11 further includes an outer thread 18 formed or provided in the other end 16 thereof, for threading or engaging with a lock nut 19, for example.

Figure 8:
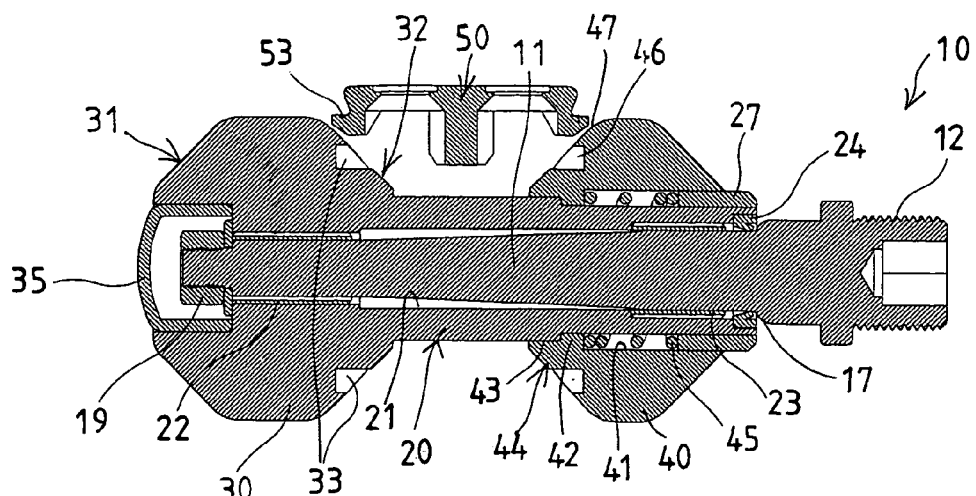
FIG. 8 is a cross sectional view of the pedal device, taken along lines 8—8 of FIG. 6.
Figure 9:
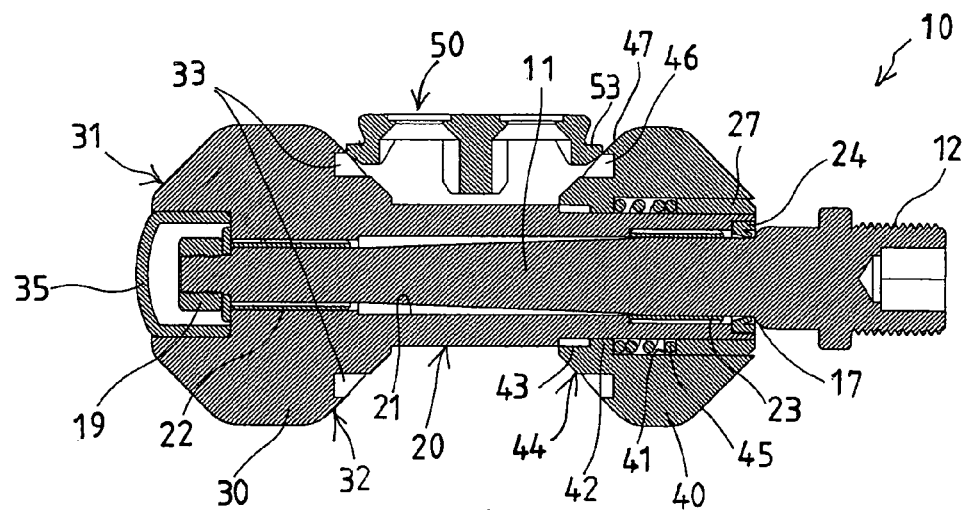
FIGS. 9 and 10 are cross sectional views similar to FIG. 8, illustrating the operation of the pedal device.
Figure 10:
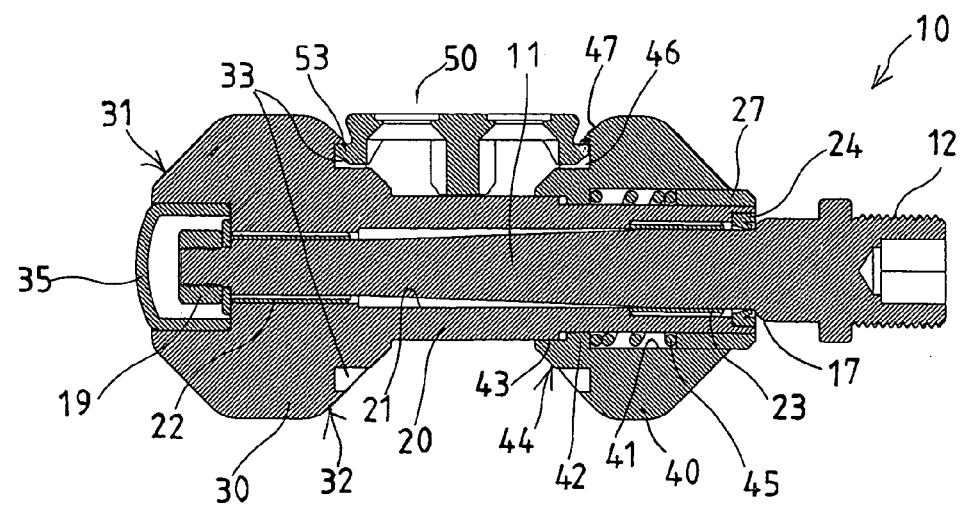

A barrel 20 includes a bore 21 formed therein for rotatably receiving or engaging onto the shaft 11, with one or more, such as two gaskets 22, 23 which are preferably engaged onto the cylindrical segments 14, 15 of the shaft 11 respectively, best shown in FIGS. 8–10. Another gasket or sealing ring 24 may further be provided and engaged into one end or inner end 25 of the barrel 20, and engaged with the peripheral shoulder 17 of the shaft 11 (FIGS. 8–10), for limiting the barrel 20 to rotate relative to the shaft 11 only, and for preventing the barrel 20 from sliding longitudinally relative to or along the shaft 11.

Figure 3:
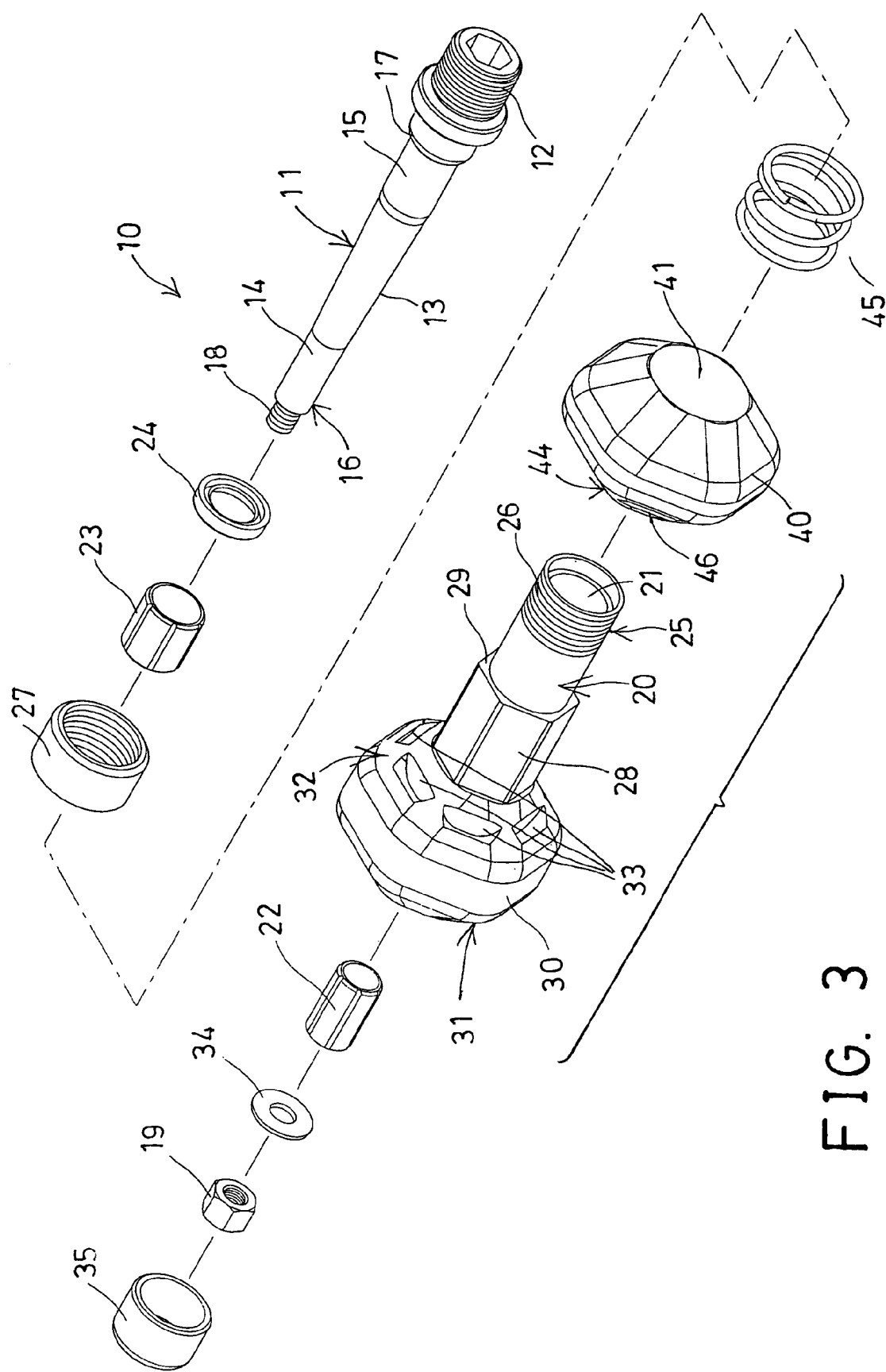
FIG. 3 is an exploded view illustrating one of the pedal devices.
Figure 4:
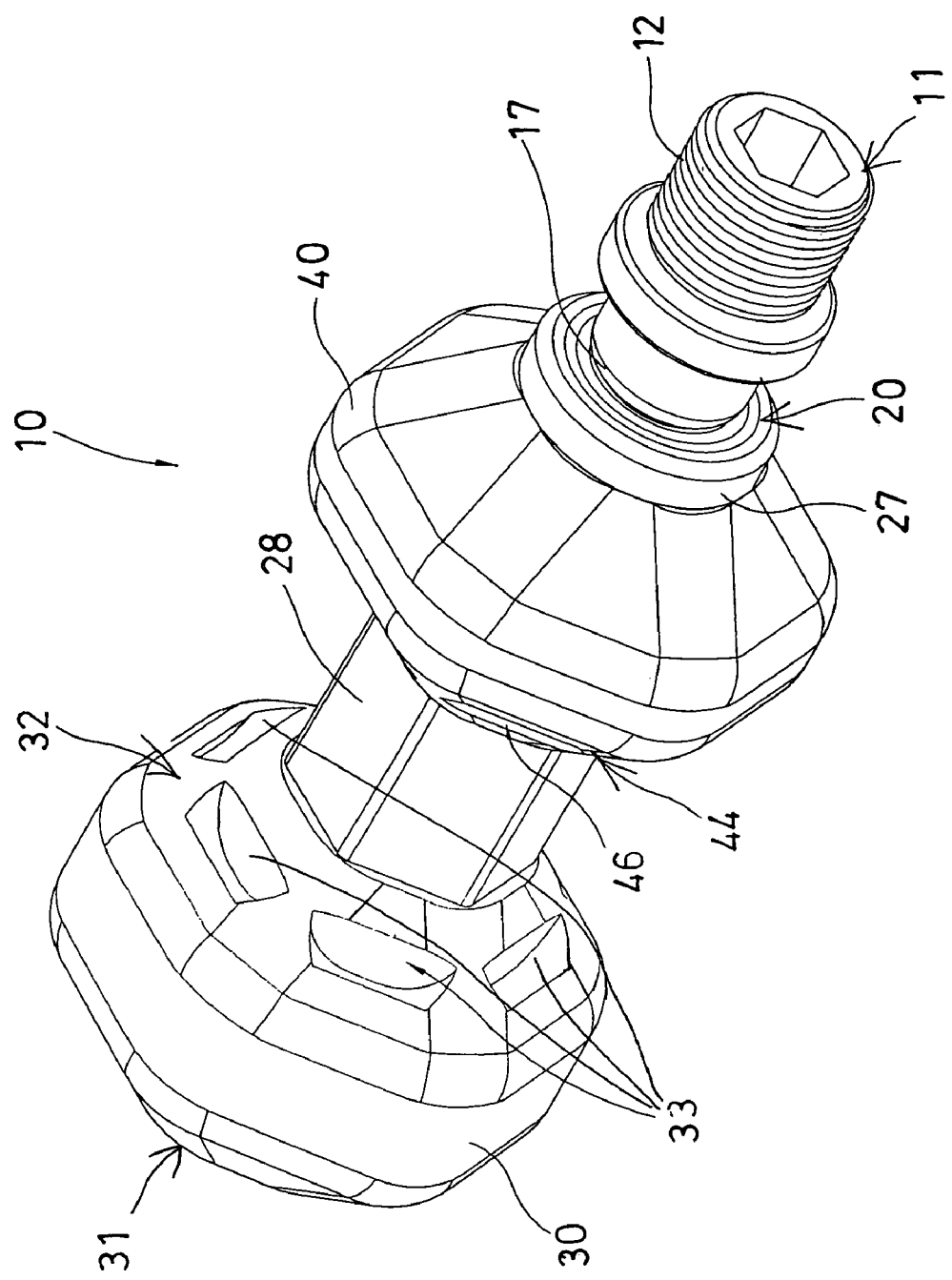
FIG. 4 is a perspective view illustrating the pedal device as shown in FIG. 3.
Figure 5:
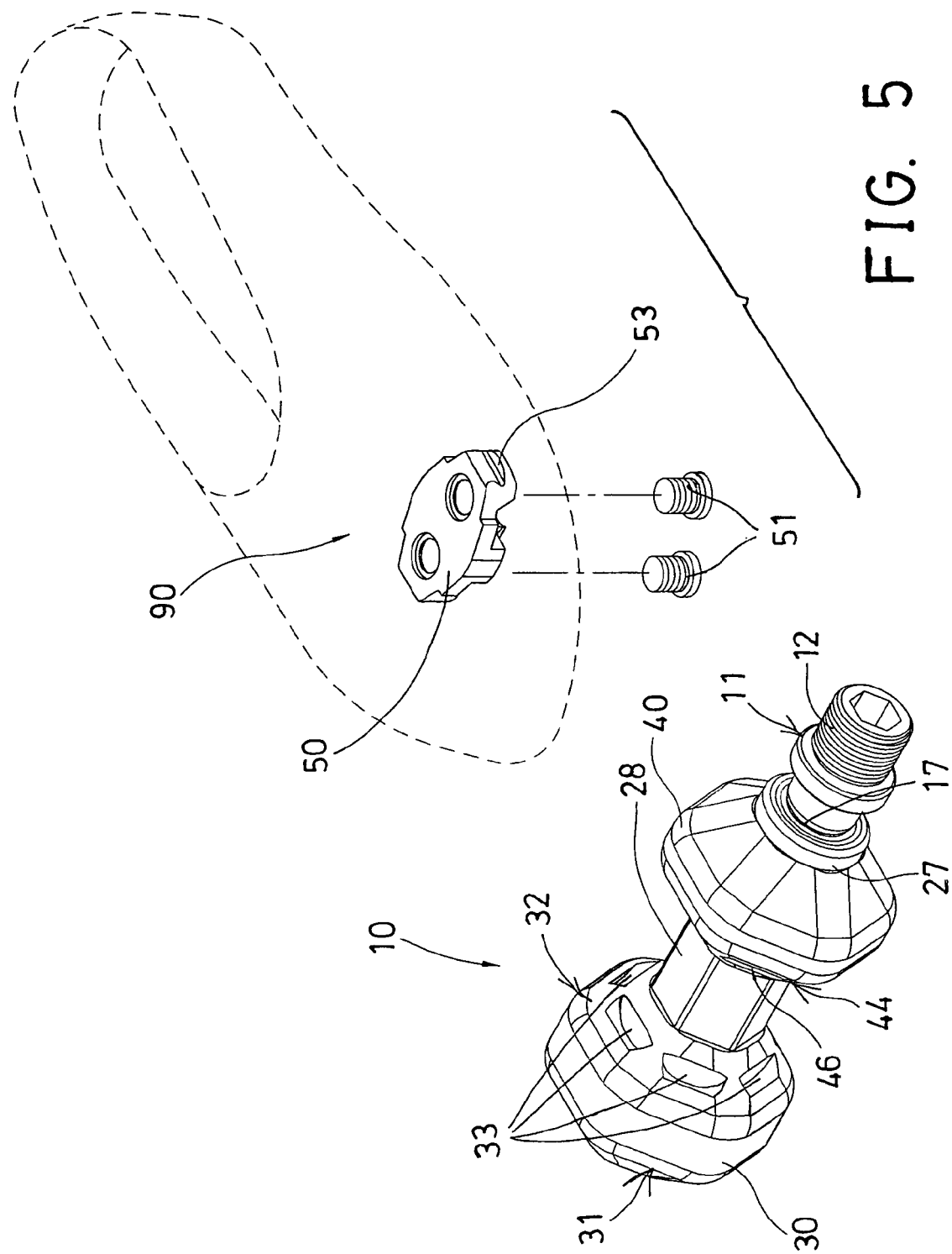
FIG. 5 is a partial exploded view illustrating the operation of the pedal device.

The barrel 20 includes an outer thread 26 formed or provided in the inner end 25 thereof, for threading or engaging with a lock nut 27, and includes an enlarged peripheral swelling or segment 28 formed or provided in the middle portion thereof, and preferably having a non-circular cross section, such as a hexagonal cross section as shown in FIGS. 3–5. The peripheral swelling or segment 28 includes an outer diameter greater than that of the barrel 20, for forming or defining a peripheral shoulder 29 between the barrel 20 and the peripheral swelling or segment 28.

The barrel 20 further includes an enlarged head or fixed seat 30 formed or provided in the other or outer end 31 thereof, and having an inclined or tapered inner peripheral surface 32, and having a number of recesses 33 formed in the inclined or tapered inner peripheral surface 32. It is preferable that a washer 34 is further provided and engaged onto the threaded end 16 of the shaft 11, and engaged between the lock nut 19 and the gasket 22, for allowing the lock nut 19 to be solidly threaded or secured to the threaded end 16 of the shaft 11. A cap 35 may be engaged into the outer end 31 of the barrel 20, for enclosing and shielding the lock nut 19 and the threaded end 16 of the shaft 11.

A slidable or movable seat 40 includes a bore 41 formed therein for rotatably or slidably receiving or engaging onto the barrel 20, and includes a projection 42, such as a peripheral projection 42 extended into the bore 41 thereof, for selectively engaging with the peripheral swelling or segment 28 and/or the peripheral shoulder 29 of the barrel 20 (FIGS. 8–10), and for limiting the movable seat 40 to move or to slide relative to the barrel 20 and the fixed seat 30. The movable seat 40 further includes a non-circular opening 43 formed in the inner portion 44 thereof, for selectively engaging with the non-circular peripheral segment 28 of the barrel 20, and thus for selectively anchoring the movable seat 40 to the barrel 20, and for preventing the movable seat 40 from being rotated relative to the barrel 20 (FIGS. 8, 10).

A spring member 45 is engaged onto the barrel 20 and engaged within the bore 41 of the movable seat 40, and engaged between the barrel 20 or the lock nut 27 and the projection 42 of the movable seat 40, for biasing or forcing the non-circular opening 43 of the movable seat 40 to engage with the corresponding non-circular peripheral segment 28 of the barrel 20, and thus to selectively anchor the movable seat 40 to the barrel 20 and to prevent the movable seat 40 from being rotated relative to the barrel 20. The movable seat 40 further includes a number of recesses 46 formed in the inner portion 44 thereof, for facing toward or for aligning with the recesses 33 of the fixed seat 30 of the barrel 20.

For example, when the non-circular opening 43 of the movable seat 40 is biased or forced to engage with the corresponding non-circular peripheral segment 28 of the barrel 20, the movable seat 40 may be anchored or positioned to the barrel 20 at a selected angular position, and arranged to allow the recesses 46 of the movable seat 40 to be aligned with the recesses 33 of the fixed seat 30 of the barrel 20. It is preferable that the movable seat 40 further includes an inclined or tapered inner peripheral surface 47 formed in the inner portion 44 thereof, and having the recesses 46 formed therein, and facing toward the inclined or tapered inner peripheral surface 32 of the fixed seat 30 of the barrel 20 (FIGS. 6–10).

As shown in FIGS. 5–10, an attachment 50 may be attached or secured to the bicycle shoe 90 with one or more fasteners 51, or the like, and includes two end catches 53 for selectively engaging with the recesses 33, 46 of the fixed seat 30 of the barrel 20 and the movable seat 40, and for selectively anchoring or positioning the bicycle shoe 90 to the seats 30, 40 of the pedal device 10. The inclined or tapered inner peripheral surface 32 of the fixed seat 30 of the barrel 20 and the inclined or tapered inner peripheral surface 47 of the movable seat 40 may facilitate and may guide the end catches 53 of the attachment 50 to engage with the recesses 33, 46 of the fixed seat 30 of the barrel 20 and the movable seat 40.

In operation, as shown in FIGS. 8–10, when the bicycle shoe 90 is stepped onto the pedal device 10, to force the end catches 53 of the attachment 50 to engage with the seats 30, 40, the inclined surfaces 32, 47 of the seats 30, 40 may guide and facilitate the end catches 53 of the attachment 50 to engage with the recesses 33, 46 of the seats 30, 40. The movable seat 40 may be forced and moved away from the fixed seat 30, against the spring member 45, by the attachment 50, before the end catches 53 of the attachment 50 are engaged with or into the recesses 33, 46 of the seats 30, 40 again, to allow the attachment 50 and the bicycle shoe 90 to be easily anchored to the seats 30, 40 of the pedal device 10 without rotating the attachment 50 and the bicycle shoe 90 relative to the pedal device 10.

Figure 6:
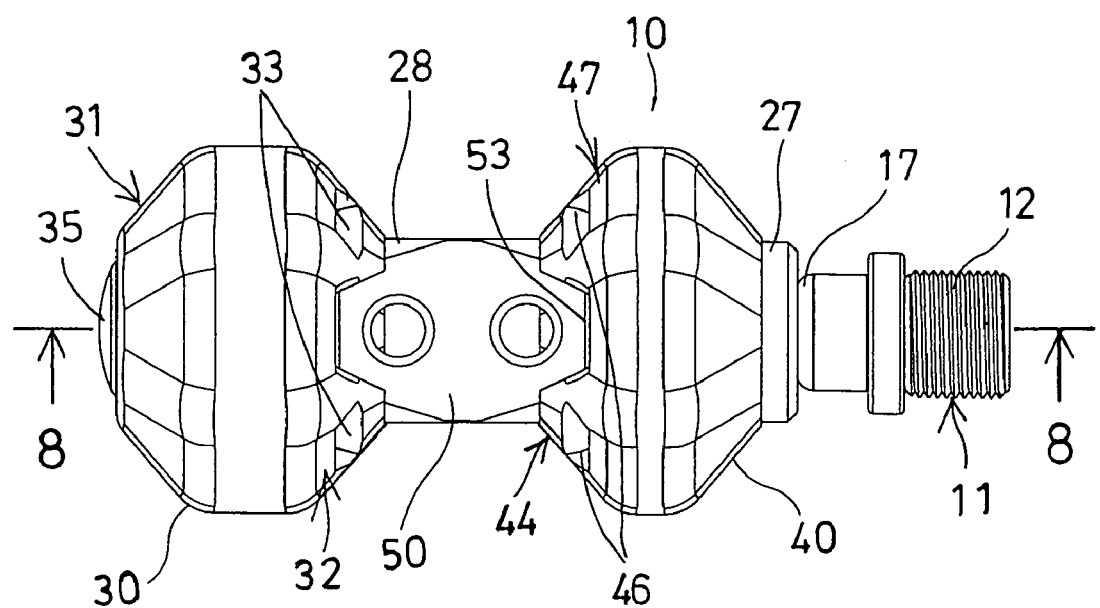
FIG. 6 is an upper plan view of the pedal device.
Figure 7:
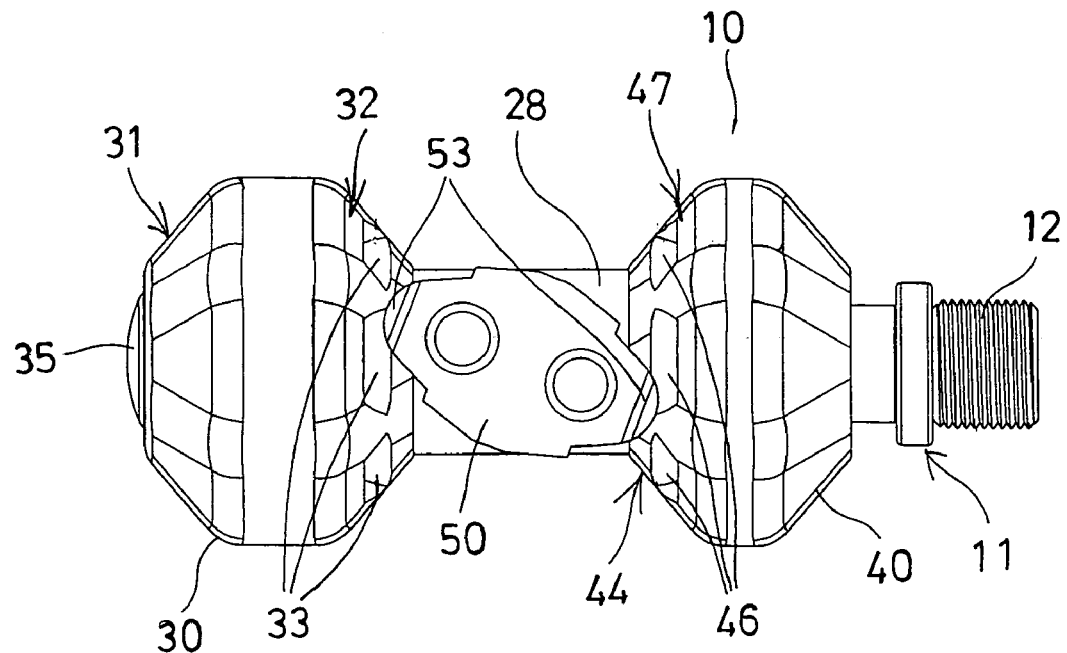
FIG. 7 is an upper plan view similar to FIG. 6, illustrating the operation of the pedal device.

As shown in FIGS. 6 and 7, when it is required to detach or to disengage the attachment 50 and the bicycle shoe 90 from the seats 30, 40 of the pedal device 10, it is only required to rotate the attachment 50 and the bicycle shoe 90 relative to the pedal device 10 for a selected angle (FIG. 7), to allow the end catches 53 of the attachment 50 to be disengaged from the recesses 33, 46 of the seats 30, 40, and thus to allow the attachment 50 and the bicycle shoe 90 to be easily and quickly disengaged from the seats 30, 40 of the pedal device 10.

The conventional or typical attachments for bicycle pedals failed to disclose or to teach a slidable or movable seat 40 that is moveable or slidable relative to a fixed seat 30 of a barrel 20, to allow the movable seat 40 to be forced and moved away from the fixed seat 30 by the attachment 50, and to allow the attachment 50 and the bicycle shoe 90 to be easily anchored to the seats 30, 40 of the pedal device 10 without rotating the attachment 50 and the bicycle shoe 90 relative to the pedal device 10.

Accordingly, the pedal device in accordance with the present invention may be attached to various cycling apparatuses, for allowing bicycle shoes to be quickly attached or anchored to the pedal device, and also to be quickly and selectively detached or disengaged from the pedal device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pedal device for connecting a bicycle shoe to a cycling apparatus, said pedal device comprising:
   a shaft including a first end adapted for perpendicular attachment to a crank arm of a cycling apparatus;
   a barrel having an elongated bore formed therein for receiving and engaging onto the shaft;
   a fixed seat provided on one end of the barrel wherein the fixed seat includes an enlarged head with a plurality of identical recesses formed therein,
   a movable seat slidably attached onto said barrel and slidable relative to said fixed seat wherein the movable seat also includes an enlarged head with a plurality of identical recesses formed therein and facing toward the recesses of the fixed seat;
   a means for biasing the movable seat to move towards the fixed seat on the barrel; and
   an attachment adapted to be attached to a bicycle shoe wherein the attachment includes two end catches for selectively engaging with the recesses of the fixed and movable seats thereby selectively anchoring and positioning said bicycle shoe to said fixed and movable seats of the pedal device, the movable seat being movable away from the fixed seat against the biasing means by the attachment before the end catches are engaged with the recesses of the fixed and movable seats, the barrel includes a non-circular peripheral segment provided thereon and the movable seat includes a non-circular opening formed therein such that the movable seat can be selectively engaged and anchored to the barrel.

2. The pedal device as claimed in claim 1, wherein said movable seat includes a projection extended therein, for selectively engaging with said segment of said barrel and for limiting said movable seat to move relative to said barrel and said fixed seat.

3. The pedal device as claimed in claim 2, wherein said barrel includes a nut secured thereon, and said biasing means includes a said spring member engaged between said lock nut of said barrel and said projection of said movable seat, for biasing and forcing said movable seat to move toward said fixed seat of said barrel.

4. The pedal device as claimed in claim 1, wherein said movable seat includes an inclined surface formed therein and having said recesses thereof formed therein, for guiding said end catches of said attachment to engage with said recesses of said movable seat.

5. The pedal device as claimed in claim 1, wherein said fixed seat includes an inclined surface formed therein and having said recesses thereof formed therein, for guiding said end catches of said attachment to engage with said recesses of said fixed seat.

6. The pedal device as claimed in claim 1, wherein said shaft includes a tapered segment provided thereon and located between two cylindrical segments, and two gaskets engaged onto said cylindrical segments of said shaft respectively, for supporting said barrel on said shaft.

* * * * *